(12) United States Patent
Mamura

(10) Patent No.: US 9,313,370 B2
(45) Date of Patent: Apr. 12, 2016

(54) IMAGE PROCESSING APPARATUS AND IMAGE FORMING APPARATUS

(71) Applicant: KYOCERA Document Solutions Inc.

(72) Inventor: Toshiki Mamura, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 14/333,932

(22) Filed: Jul. 17, 2014

(65) Prior Publication Data

US 2015/0029523 A1   Jan. 29, 2015

(30) Foreign Application Priority Data

Jul. 26, 2013 (JP) ................................ 2013-156131

(51) Int. Cl.
  *G06F 15/00*   (2006.01)
  *H04N 1/56*   (2006.01)
  *H04N 1/60*   (2006.01)

(52) U.S. Cl.
  CPC ............... *H04N 1/56* (2013.01); *H04N 1/6022* (2013.01)

(58) Field of Classification Search
  None
  See application file for complete search history.

(56) References Cited

U.S. PATENT DOCUMENTS

| 2004/0114166 A1* | 6/2004 | Kubo ............................. 358/1.9 |
| 2005/0046882 A1* | 3/2005 | Kobayashi .................... 358/1.9 |
| 2009/0073467 A1* | 3/2009 | Iida .............................. 358/1.9 |
| 2011/0229023 A1* | 9/2011 | Jones et al. ................... 382/162 |
| 2012/0134580 A1* | 5/2012 | Murakami et al. ........... 382/163 |

FOREIGN PATENT DOCUMENTS

| JP | 2001-119591 | 4/2001 |
| JP | 2001-353888 | 12/2001 |
| JP | 2003-060929 | 2/2003 |
| JP | 2005-184333 | 7/2005 |
| JP | 2007-235583 | 9/2007 |
| JP | 2009-049628 | 3/2009 |

* cited by examiner

*Primary Examiner* — Helen Q Zong

(57) ABSTRACT

In an image processing apparatus, an area separating unit classifies a property of a pixel in an image into any of plural properties that include at least a character property and an image property, a black generation and UCR processing unit performs a black generation process and a UCR process for the image, and a process amount specifying unit specifies a black generation amount and a UCR amount used in the black generation process and the UCR process to the black generation and UCR processing unit. Further, the process amount specifying unit sets the black generation amount and the UCR amount on the basis of a smallest color component value of a pixel with the image property using a conversion characteristic that varies in accordance with a lightness value, a chroma saturation value and a hue value of the pixel with the image property.

2 Claims, 5 Drawing Sheets

IMAGE PROCESSING APPARATUS AND IMAGE FORMING APPARATUS

CROSS-REFERENCE TO RELATED APPLICATIONS

This application relates to and claims priority rights from Japanese Patent Application No. 2013-156131, filed on Jul. 26, 2013, the entire disclosures of which are hereby incorporated by reference herein.

BACKGROUND

1. Field of the Present Disclosure

The present disclosure relates to an image processing apparatus and an image forming apparatus.

2. Description of the Related Art

An image forming apparatus has an area separating function that identifies a property of each area in an image such as a character area, an image area, or the other areas. The image forming apparatus performs the most suitable process for each property to gain the image quality of an area having each property.

Such an image forming apparatus performs printing of a character area using a single color of Black (K), and performs printing of an image area either using three colors of CMY (Cyan, Magenta, and Yellow) to express vivid colors (i.e. chromatic colors with middle or high luminance) or using four colors of CMYK with a black generation and UCR (Under Color Removal) process to express dense colors (i.e. chromatic colors with low luminance).

However, the area separating function sometimes identifies a wrong property. For example, in some cases an edge part in a bold character is identified as a character area but an inner part of the bold character is identified as an image area. In such cases, the image processing of the character edge part and the inner part uses different settings therebetween, and consequently results in a density difference between the character edge part and the inner part.

Further, in some cases, even in a gradation image, some partial pixels are not identified as an image area but identified as a character area. In such cases, the gradation image is partially printed with a single color of Black, and consequently strong granular feeling may appear in the image.

An image processing apparatus (referred as the first technique) changes a black generation amount in accordance with the smallest value among color component values of CMY in an input signal and a difference between the largest value and the smallest value.

Further, another image processing apparatus (referred as the second technique) identifies a hue in a CMY input signal, and changes a black generation amount in accordance with the identified hue.

Furthermore, another image processing apparatus (referred as the third technique) distinguishes a black character's inner part and a black character's edge and identifies a density of the black character's inner part; and for the inner part of a high density bold character, performs a different process from a process for the character edge, and for the inner part of a low density bold character, performs a similar process or a relatively near process to a process for the character edge.

Furthermore, another image processing apparatus (referred as the fourth technique) converts input RGB data into the HLS color space and changes the data to an achromatic color if a chroma saturation of the data falls into a predetermined area in the HLS space; and changes an input gradation level as the maximum black generation amount when the black generation is performed on the basis of the input data.

However, in the aforementioned first and third techniques, the image processing apparatuses do not use hue information and therefore do not perform proper black generation corresponding to a hue.

Further, in the aforementioned second technique, the image processing apparatus sometimes reads a CMY input signal of an inner part of a bold black character as not an achromatic color but a chromatic color with low luminance, and in such a case, the inner part of a bold black character still has low image quality.

Furthermore, in the aforementioned fourth technique, the image processing apparatus increases the black generation amount only for a black character, and therefore a large difference of the black generation amounts may appears between a part identified as a black character in an image area and the other part and consequently granular feeling may be emphasized in a gradation image.

As mentioned, in the aforementioned techniques, a black character still has low image quality caused by incorrectly identifying an inner part of the black character as an image area.

SUMMARY

An image processing apparatus according to an aspect of the present disclosure includes an area separating unit, a black generation and UCR processing unit, and a process amount specifying unit. The area separating unit is configured to classify a property of a pixel in an image into any of plural properties that include at least a character property and an image property. The black generation and UCR processing unit is configured to perform a black generation process and a UCR process for the image. The process amount specifying unit is configured to specify a black generation amount and a UCR amount used in the black generation process and the UCR process to the black generation and UCR processing unit. The process amount specifying unit is further configured to set the black generation amount and the UCR amount on the basis of a smallest color component value of a pixel with the image property using a conversion characteristic that varies in accordance with a lightness value, a chroma saturation value and a hue value of the pixel with the image property.

An image forming apparatus according to an aspect of the present disclosure includes the aforementioned image processing apparatus.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
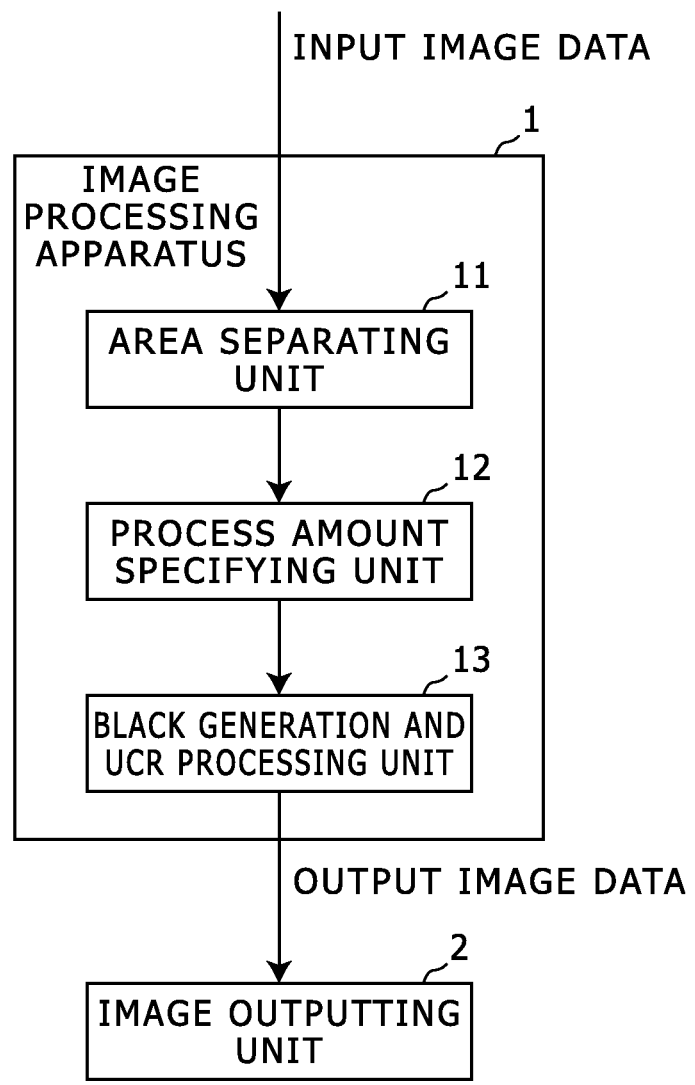
FIG. 1 shows a block diagram that indicates a configuration of an image forming apparatus according to an embodiment of the present disclosure.

FIG. 1 shows a block diagram that indicates a configuration of an image forming apparatus according to an embodiment of the present disclosure. The image forming apparatus shown in FIG. 1 includes an image processing apparatus 1 and an image outputting unit 2.

The image processing apparatus 1 includes an area separating unit 11, a process amount specifying unit 12, and a black generation and UCR processing unit 13.

The area separating unit 11 classifies a property of a pixel in an image into any of plural properties that include at least a "character" property and an "image" property.

The process amount specifying unit specifies a black generation amount and a UCR amount used in a black generation process and a UCR process to the black generation and UCR processing unit 13.

The black generation and UCR processing unit 13 performs the black generation process and the UCR process for the image using the black generation amount and the UCR amount specified by the process amount specifying unit 12.

Specifically, the process amount specifying unit 12 sets the black generation amount and the UCR amount on the basis of a smallest color component value (here, the smallest value among color component values of Cyan, Magenta, and Yellow) of a pixel with the "image" property using a conversion characteristic that varies in accordance with a lightness value, a chroma saturation value and a hue value of the pixel with the "image" property.

Further, in this embodiment, the process amount specifying unit 12 selects a conversion characteristic in which a smaller lightness value of the pixel with the "image" property results in a larger black generation amount and a larger UCR amount, and sets the black generation amount and the UCR amount on the basis of the smallest color component value of the pixel with the "image" property using the selected conversion characteristic.

Furthermore, the process amount specifying unit 12 selects a conversion characteristic for a lightness value in which a smaller chroma saturation value results in a larger black generation amount and a larger UCR amount, and sets the black generation amount and the UCR amount on the basis of the smallest color component value of the pixel using the selected conversion characteristic.

Furthermore, the process amount specifying unit 12 selects a conversion characteristic for a lightness and a chroma saturation in which a black generation amount and a UCR amount in case that the hue value falls into a predetermined green range are larger than a black generation amount and a UCR amount in case that the hue value does not fall into the predetermined green range, respectively, and sets the black generation amount and the UCR amount on the basis of the smallest color component value of the pixel using the selected conversion characteristic.

Further, the image outputting unit 2 outputs an image for which a black generation process and a UCR process have been processed by the image processing apparatus 1. Specifically, in an electrographic manner using four color toner of Cyan, Magenta, Yellow, and Black, the image outputting unit 2 prints a color image processed by the image processing apparatus 1 on a printing paper sheet.

The following part explains a behavior of the aforementioned image forming apparatus.

Firstly, a document image is scanned by an unshown image scanning device (e.g. a CCD scanner or a CIS scanner), and image data of the document image (RGB data) is inputted to the image processing apparatus 1, and the image data is converted from RGB data to CMYK data in the image processing apparatus 1.

The area separating unit 11 classifies a property of each pixel in the image into any of a "character" property, an "image" property and "the others" property.

Subsequently, the process amount specifying unit 12 repeatedly selects an objective pixel in the image in order and sets a black generation amount and a UCR amount of the objective pixel on the basis of the property of the objective pixel identified by the area separating unit 11.

Figure 2:
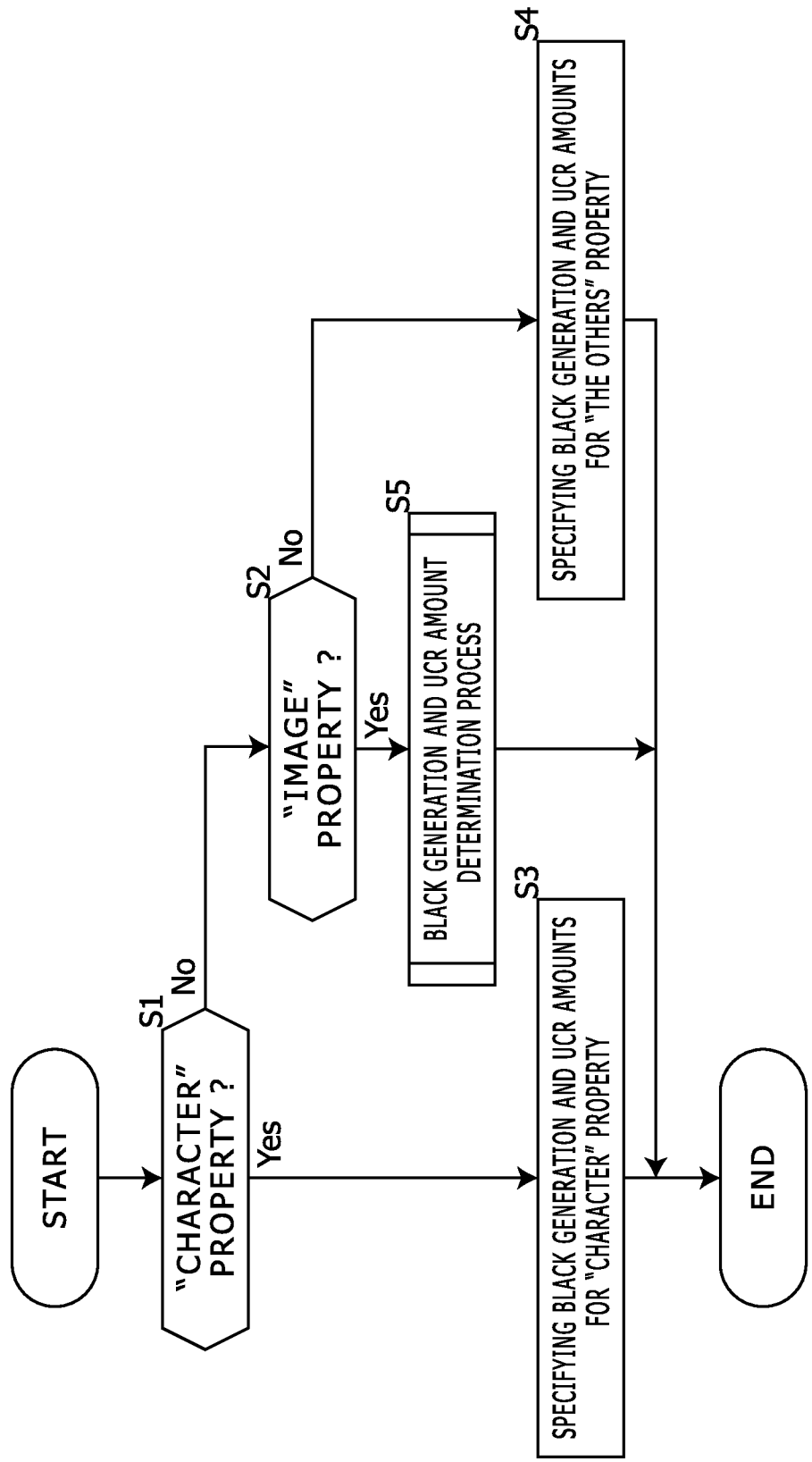
FIG. 2 shows a flowchart that explains a behavior of the process amount specifying unit 12 in FIG. 1.

FIG. 2 shows a flowchart that explains a behavior of the process amount specifying unit 12 in FIG. 1. The process amount specifying unit 12 identifies whether the property of the objective pixel is the "character" property or not (in Step S1). If the property of the objective pixel is not the "character" property, the process amount specifying unit 12 identifies whether the property of the objective pixel is the "image" property or not (in Step S2).

If the property of the objective pixel is the "character" property, the process amount specifying unit 12 sets and specifies a black generation amount and a UCR amount for the "character" property as the black generation amount and the UCR amount of the objective pixel (in Step S3)

If the property of the objective pixel is neither the "character" property nor the "image" property, the process amount specifying unit 12 sets and specifies a black generation amount and a UCR amount for "the others" property as the black generation amount and the UCR amount of the objective pixel (in Step S4).

Otherwise, if the property of the objective pixel is the "image" property, the process amount specifying unit 12 selects a conversion characteristic on the basis of a lightness value, a chroma saturation value and a hue value of the objective pixel; identifies a black generation amount and a UCR amount on the basis of the smallest color component value among CMY of the objective pixel using the selected conversion characteristic; and sets the identified black generation amount and the identified UCR amount as the black generation amount and the UCR amount of the objective pixel (in Step S5).

Figure 3:
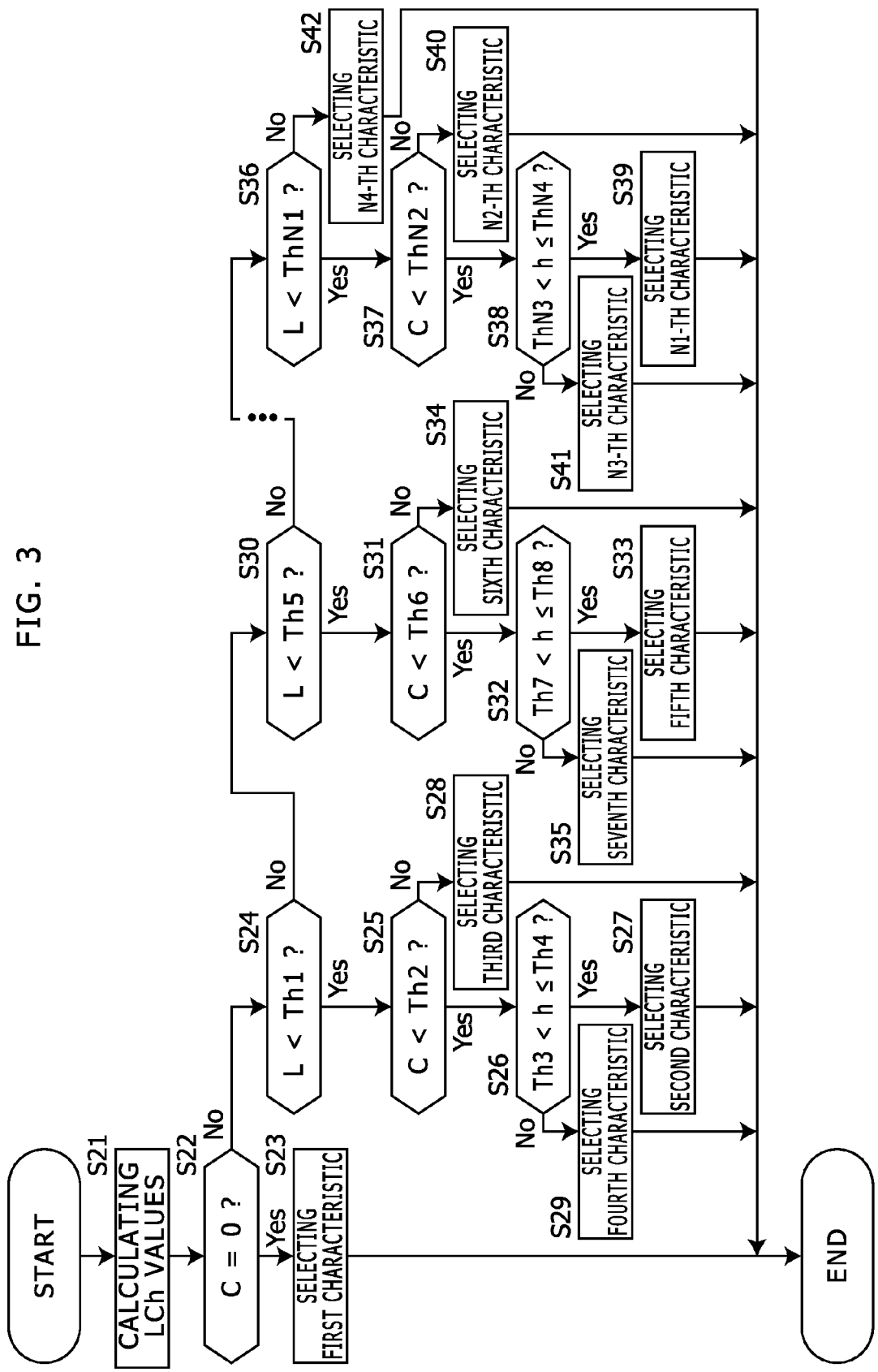
FIG. 3 shows a flowchart that explains the process of Step S5 in FIG. 2 in detail.

FIG. 3 shows a flowchart that explains the process of Step S5 in FIG. 2 in detail.

The process amount specifying unit 12 converts a set of CMYK color component values of the objective pixel to a set of RGB color component values and further converts the set of the RGB color component values to a set of LCh color component values (in Step S21).

Subsequently, the process amount specifying unit 12 identifies whether the chroma saturation value C is zero or not (in Step S22). If the chroma saturation value C is zero, the process amount specifying unit 12 selects the first characteristic as the conversion characteristic (in Step S23). In this case, the objective pixel has an achromatic color, and therefore, for example, the first characteristic converts all of the CMY color component values to a K value.

Contrarily, if the chroma saturation value C is not zero, the process amount specifying unit 12 identifies whether the lightness value L is less than a first threshold value Th1 (in Step S24).

If the lightness value L is less than the first threshold value Th1, the process amount specifying unit 12 identifies whether the chroma saturation value C is less than a second threshold value Th2 (in Step S25).

If the chroma saturation value C is less than the second threshold value Th2, the process amount specifying unit 12 identifies whether the hue value h is larger than a third threshold value Th3 and either equal to or less than a fourth threshold value Th4 (in Step S26).

A range larger than the third threshold value Th3 and either equal to or less than the fourth threshold value Th4 is a green range in which a color is easily distinguished as a black color incorrectly.

If the lightness value L is less than the first threshold value Th1, the chroma saturation value C is less than the second threshold value Th2, and the hue value h is larger than the third threshold value Th3 and either equal to or less than the fourth threshold value Th4, then the process amount specifying unit 12 selects the second characteristic as the conversion characteristic (in Step S27).

If the lightness value L is less than the first threshold value Th1, and the chroma saturation value C is either equal to or larger than the second threshold value Th2, then the process amount specifying unit 12 selects the third characteristic as the conversion characteristic (in Step S28).

If the lightness value L is less than the first threshold value Th1, the chroma saturation value C is less than the second threshold value Th2, and either the hue value h is either equal to or less than the third threshold value Th3 or the hue value h is larger than the fourth threshold value Th4, then the process amount specifying unit selects the fourth characteristic as the conversion characteristic (in Step S29).

Contrarily, if the lightness value L is either equal to or larger than the first threshold value Th1, the process amount specifying unit 12 identifies whether the lightness value L is less than a fifth threshold value Th5 (where Th5>Th1) (in Step S30).

If the lightness value L is less than the fifth threshold value Th4, the process amount specifying unit 12 identifies whether the chroma saturation value C is less than a sixth threshold value Th6 (in Step S31).

If the chroma saturation value C is less than the sixth threshold value Th6, the process amount specifying unit 12 identifies whether the hue value h is larger than a seventh threshold value Th7 and either equal to or less than an eighth threshold value Th8 (in Step S32).

A range larger than the seventh threshold value Th7 and either equal to or less than the eighth threshold value Th8 is a green range in which a color is easily distinguished as a black color incorrectly.

If the lightness value L is less than the fifth threshold value Th5, the chroma saturation value C is less than the sixth threshold value Th6, and the hue value h is larger than the seventh threshold value Th7 and either equal to or less than the eighth threshold value Th8, then the process amount specifying unit 12 selects the fifth characteristic as the conversion characteristic (in Step S33).

If the lightness value L is less than the fifth threshold value Th5, and the chroma saturation value C is either equal to or larger than the sixth threshold value Th6, then the process amount specifying unit 12 selects the sixth characteristic as the conversion characteristic (in Step S34).

If the lightness value L is less than the fifth threshold value Th5, the chroma saturation value C is less than the sixth threshold value Th6, and either the hue value h is either equal to or less than the seventh threshold value Th7 or the hue value h is larger than the eighth threshold value Th8, then the process amount specifying unit selects the seventh characteristic as the conversion characteristic (in Step S35).

The aforementioned processes (i.e. the processes in Steps S24 to S29 or the processes in Steps S30 to S35) are repeatedly performed in an arbitrary number of stages with changing the threshold values.

In the last stage, the process amount specifying unit 12 firstly identifies whether the lightness value L is less than an N1-th threshold value ThN1 (where ThN1>Th1, ThN1>Th5, . . . ) (in Step S36).

If the lightness value L is less than the N1-th threshold value ThN1, the process amount specifying unit 12 identifies whether the chroma saturation value C is less than an N2-th threshold value ThN2 (in Step S37).

If the chroma saturation value C is less than the N2-th threshold value ThN2, the process amount specifying unit 12 identifies whether the hue value h is larger than an N3-th threshold value ThN3 and either equal to or less than an N4-th threshold value ThN4 (in Step S38).

A range larger than the N3-th threshold value ThN3 and either equal to or less than the N4-th threshold value ThN4 is a green range in which a color is easily distinguished as a black color incorrectly.

If the lightness value L is less than the N1-th threshold value ThN1, the chroma saturation value C is less than the N2-th threshold value ThN2, and the hue value h is larger than the N3-th threshold value ThN3 and either equal to or less than the N4-th threshold value ThN4, then the process amount specifying unit 12 selects the N1-th characteristic as the conversion characteristic (in Step S39).

If the lightness value L is less than the N1-th threshold value ThN1, and the chroma saturation value C is either equal to or larger than the N2-th threshold value ThN2, then the process amount specifying unit 12 selects the N2-th characteristic as the conversion characteristic (in Step S40).

If the lightness value L is less than the N1-th threshold value ThN1, the chroma saturation value C is less than the N2-th threshold value ThN2, and either the hue value h is either equal to or less than the N3-th threshold value ThN3 or the hue value h is larger than the N4-th threshold value ThN4, then the process amount specifying unit 12 selects the N3-th characteristic as the conversion characteristic (in Step S41).

Contrarily, if the lightness value L is either equal to or larger than the N1-th threshold value ThN1, the process amount specifying unit 12 selects the N4-th characteristic as the conversion characteristic (in Step S42). The N4-th characteristic is a default conversion characteristic for the "image" property.

Figure 4:
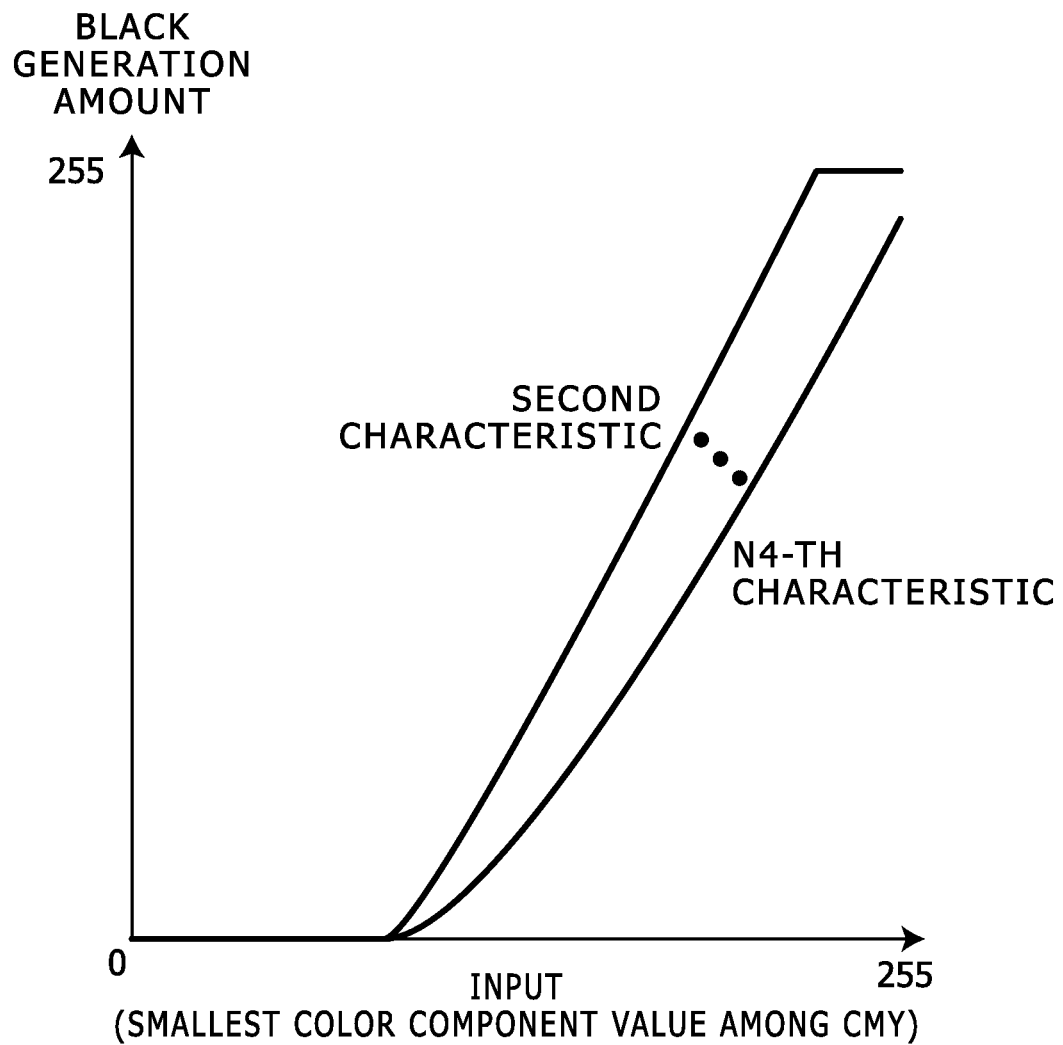
FIG. 4 shows a diagram that explains stepwise changing conversion characteristics of black generation amount used in the image processing apparatus 1 shown in FIG. 1.
Figure 5:
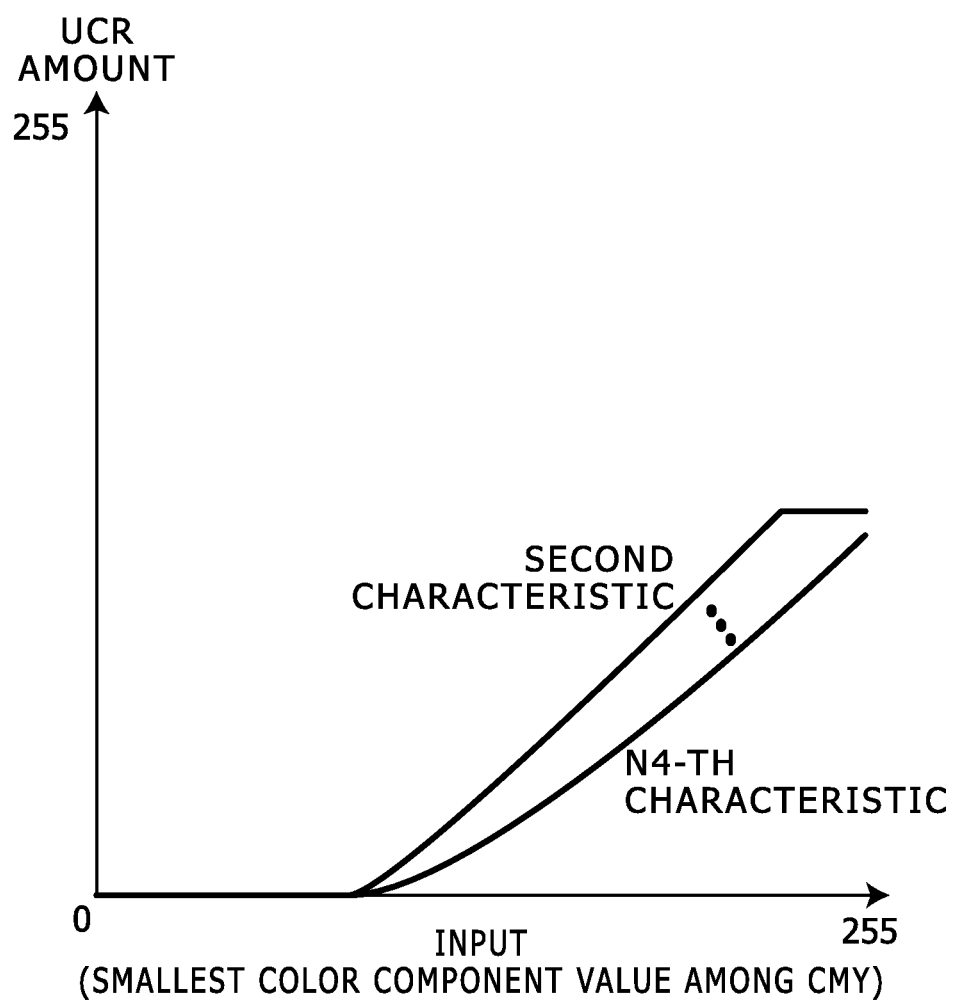
FIG. 5 shows a diagram that explains stepwise changing conversion characteristics of UCR amount used in the image processing apparatus 1 shown in FIG. 1.

FIG. 4 shows a diagram that explains stepwise changing conversion characteristics of black generation amount used in the image processing apparatus 1 shown in FIG. 1. FIG. 5 shows a diagram that explains stepwise changing conversion characteristics of UCR amount used in the image processing apparatus 1 shown in FIG. 1.

As shown in FIG. 4 and FIG. 5, the black generation amounts and the UCR amounts for the same smallest color component value among CMY are set so as to be gradually increased in the order of the N4-th characteristic, the N3-th characteristic, the N2 characteristic, the N1 characteristic, . . . , the sixth characteristic, the fifth characteristic, the fourth characteristic, the third characteristic, the second characteristic.

In the aforementioned manner, the process amount specifying unit 12 specifies the black generation amount and the UCR amount obtained using the selected conversion characteristic to the black generation and UCR processing unit 13.

The black generation and UCR processing unit 13 performs a black generation process and a UCR process for CMYK data of every objective pixel using the black generation amount and the UCR amount set for the objective pixel.

After performing the black generation process and the UCR process for all pixels in the image, the image outputting unit 2 prints an image based on the processed CMYK data.

In the aforementioned embodiment, the area separating unit 11 classifies a property of a pixel in an image into any of plural properties that include at least a "character" property and an "image" property. The process amount specifying unit specifies a black generation amount and a UCR amount used in a black generation process and a UCR process to the black generation and UCR processing unit 13. The black generation and UCR processing unit 13 performs the black generation process and the UCR process for the image using the black generation amount and the UCR amount specified by the process amount specifying unit 12. Further the process amount specifying unit 12 sets the black generation amount and the UCR amount on the basis of a smallest color component value of a pixel with the "image" property using a conversion characteristic that varies in accordance with a lightness value, a chroma saturation value and a hue value of the pixel with the "image" property.

Therefore, a pixel incorrectly identified as an image area in an inner part of a black character is classified on the basis of its LCh values and its black generation amount and its UCR amount are set using a conversion characteristic (the second characteristic or the like) near the conversion characteristic for the "character" property, and consequently, the low image quality is suppressed of the black character caused by incorrectly identifying the inner part of the black character as an image area.

The description has been presented for purposes of illustration and description, and is not intended to be exhaustive or limited.

For example, in the aforementioned embodiment, the threshold values Th2, Th6, . . . , ThN2 for the chroma saturation value C may be same as each other or may be changed from a single value by respective small amounts corresponding to the corresponding lightness threshold values.

Further, in the aforementioned embodiment, pairs of the threshold values for the hue value h (Th3, Th4), (Th7, Th8), . . . , (ThN3, ThN4) may be same as each other or may be changed from a pair of single values by respective small amounts corresponding to the corresponding lightness threshold values.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. A method of image processing using an image processing apparatus, comprising:

classifying a property of a pixel in an image into any of plural properties that include at least a character property and an image property;

performing a black generation process and a UCR process for the image;

specifying a black generation amount and a UCR amount used in the black generation process and the UCR process to the black generation and UCR processing unit;

setting the black generation amount and the UCR amount on the basis of (1) a smallest color component value of a pixel with the image property using a conversion characteristic that varies in accordance with a lightness value, a chroma saturation value and a hue value of the pixel with the image property; (2) the smallest color component value of the pixel with the image property using a conversion characteristic in which a smaller lightness value of the pixel with the image property results in a larger black generation amount and a larger UCR amount; and (3) the smallest color component value of the pixel using a conversion characteristic for a lightness value in which a smaller chroma saturation value results in a larger black generation amount and a larger UCR amount.

2. The method according to claim 1, wherein the setting the black generation amount and the UCR amount step is also on the basis of the smallest color component value of the pixel using a conversion characteristic for a lightness and a chroma saturation in which a black generation amount and a UCR amount in case that the hue value falls into a predetermined green range are larger than a black generation amount and a UCR amount in case that the hue value does not fall into the predetermined green range, respectively.

* * * * *